Nov. 8, 1955
A. R. ETTWEIN
2,723,068
SERVING TRAYS OR DISH HOLDERS PARTICULARLY WELL ADAPTED
FOR USE WITH TRAYS OR HOLDERS FOR PAPER DISHES
Filed May 6, 1953
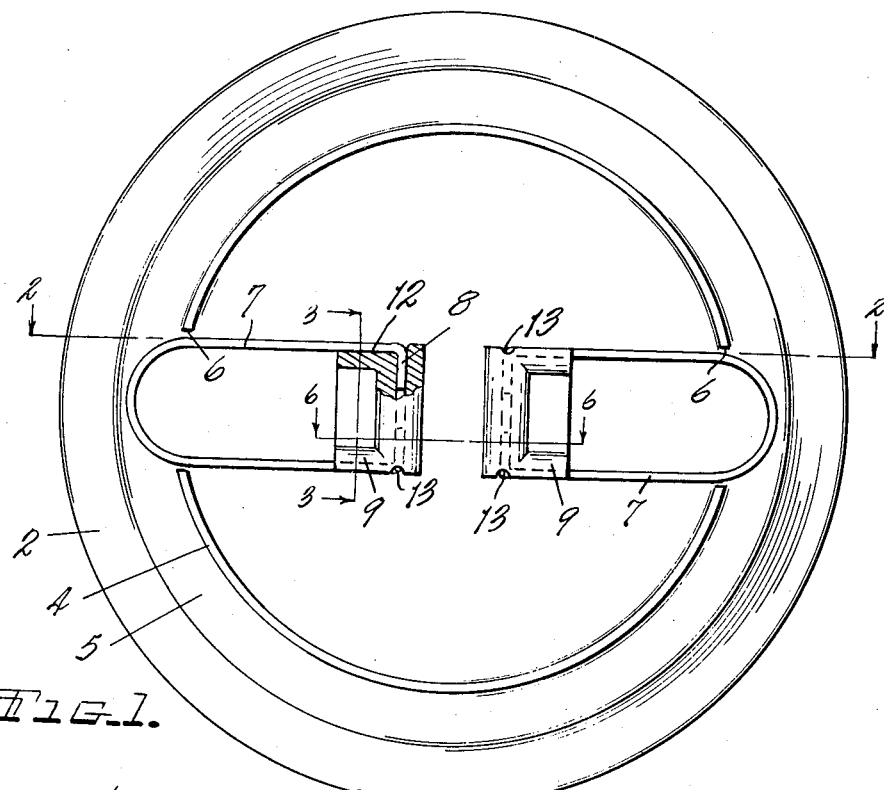
Fig. 1.
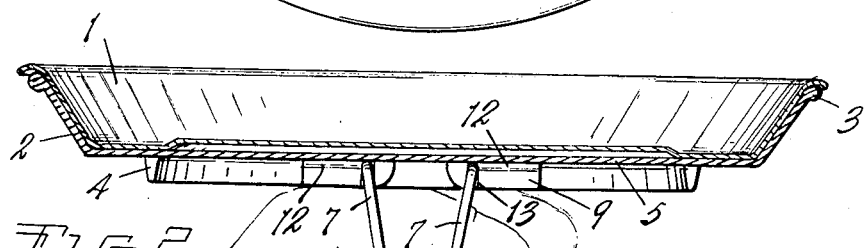
Fig. 2.
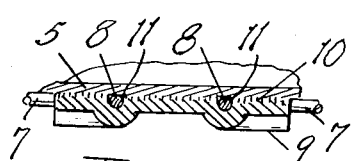
Fig. 6.
Fig. 3.
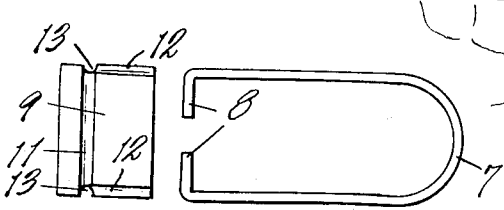
Fig. 4. Fig. 5.
INVENTOR.
Alton R. Ettwein
BY
Attorney.

United States Patent Office

2,723,068
Patented Nov. 8, 1955

---

2,723,068

SERVING TRAYS OR DISH HOLDERS PARTICULARLY WELL ADAPTED FOR USE WITH TRAYS OR HOLDERS FOR PAPER DISHES

Alton R. Ettwein, Kalamazoo, Mich.

Application May 6, 1953, Serial No. 353,285

5 Claims. (Cl. 224—48)

This invention relates to improvements in serving trays or dish holders, particularly well adapted for use with trays or holders for paper dishes.

The main objects of this invention are:

First, to provide a serving tray or dish holder provided with collapsible handle members which are disposed centrally of the tray or dish holder when in erected position and adapted for simultaneous grasping, and which may be collapsed against the underside of the tray or holder when not in use.

Second, to provide a serving tray and dish holder which may be formed mainly of molded plastic and is of relatively light weight and at the same time is strong and rigid, the handle members being mounted by combined hinge and keeper members also formed of plastic.

Third, to provide a combined tray or dish holder provided with a handle comprising a pair of handle members disposed for simultaneous grasping when in erected position and which bracingly coact one with the other to provide a substantially rigid and nontiltable handle when so grasped.

Fourth, to provide a serving tray or dish holder having these advantages, in which means are provided for supporting the tray or holder on the flat surface when the handle members are in collapsed position.

Objects relating to details and economies of the invention will appear from the description to follow. The invention is pointed out in the claims.

A preferred embodiment of the invention is illustrated in the accompanying drawing, in which:

Fig. 1 is an inverted view of a serving tray or dish holder embodying my invention with the handle members in collapsed position, a part of one of the combined hinge and keeper members being broken away to show the relation of the handle member pintles thereto.

Fig. 2 is a vertical section on a line corresponding to 2—2 of Fig. 1 with the handle in erected position, the hand grasping position being indicated by dotted lines, a paper dish being shown within a tray or holder.

Fig. 3 is a somewhat enlarged fragmentary view in section on a line corresponding to line 3—3 of Fig. 1.

Fig. 4 is an inverted view of one of the combined hinge and keeper members.

Fig. 5 is a plan view of one of the handle members.

Fig. 6 is a fragmentary view on a line corresponding to line 6—6 of Fig. 1 of a modified form of keeper.

It will be understood that the tray or dish holder may be made in various sizes and adapted to carry a plurality of dishes or receptacles or a single dish 1 as shown in Fig. 2.

It is common knowledge that most paper dishes are more or less flexible and as a result of such flexibility are difficult to handle or carry when loaded. To reduce this flexibility some paper dishes are provided with metal rims but that adds materially to the cost.

The dish shaped body member 2 of the embodiment of my invention illustrated is of a size to receive the paper dish 1. This body member 2 is formed of plastic and has an integral beaded rim 3 on its underside, the body member 2 is provided with a pair of segmentally curved ribs 4 concentric with the periphery of its bottom portion 5, the ends of the ribs being spaced at 6 to receive the handle members 7 when they are in collapsed position, as shown in Fig. 1.

The handle members 7 are of U-shape and formed of springable wire. The arms of the handle member terminate in inturned pintles 8. A combined hinge and keeper member 9 is provided for each handle member. These members 9 are also formed of plastic material and are autogenously bonded, as shown at 10 of Fig. 3, to the underside of the bottom of the holder member. They are positioned in aligned radially spaced relation, as shown in Figs. 1 and 2.

The members 9 have grooves 11 on their inner sides which coact with the bottom of the tray holder in forming bearings for the pintles 8 of the handle member. The side or longitudinal edges of the members 9 are provided with grooves 12 with which the arms of the handle members springably engage when the handle members are collapsed. This provides keepers with which the handle members are releasably engaged. The groove-like recesses 12 are arranged so that the handle members lie flat against the bottom of the tray when they are collapsed.

The members 9 have notch-like keepers 13 which open to the ends of the bearing grooves 11 and with which the handle members are springably engaged when the handle members are swung to erected position, as shown in Fig. 2, in which position they may be simultaneously grasped as is indicated. In this position the handle members converge downwardly and their ends are in contacting relation so that they coact to brace each other.

The segmental ribs 4 are of a height at least equal to the height or vertical thickness of the combined hinge and keeper members 9 so that when the handles are in collapsed position, as shown in Fig. 1, a stable support is provided for the tray or holder when it is placed on a flat surface such as a table or the like.

Serving trays or dish holders embodying my invention have many uses, for example, in self-service, roadside or curb service or the like. My trays or dish holders are especially useful wherever paper dishes or receptacles are used. It will, however be understood that they may be used in connection with any dish or dishes and made in various sizes according to the particular requirements. When the handle members are collapsed the tray or dish holders may be compactly stacked.

I have illustrated and described my invention in one particular embodiment thereof. I have not attempted to illustrate or describe other embodiments or adaptations as it is believed this disclosure will enable those skilled in the art to embody or adapt my invention as may be desired.

Having thus described my invention, what I claim as new and desire to secure by Letters Patent is:

1. A tray or dish holder comprising a dish shaped body member of molded plastic having an integral beaded rim and having opposed segmental ribs on the underside of the bottom thereof concentric with and spaced from the peripheral edge of the bottom, the ends of the ribs being spaced, a pair of springable U-shaped handle members the arms of which terminate in inturned pintles, and combined hinge and keeper members of molded plastic autogenously bonded in radial alignment to the underside of the tray and having recesses in their inner sides coacting with the bottom to provide bearings for the pintles of said handle members, and longitudinal recesses in their side edges constituting keepers with which the arms of the handle members are springably engaged when they are in their collapsed position and vertical notches aligned with said bearings in which the arms of the handle members are engaged when the handles are in erected position, the handle members when erected with their arms in said vertical notches being in downwardly converging mutually bracing relation to be simultaneously grasped with one hand, the handle members when collapsed with their arms in said longitudinal recesses extending in opposite directions from each other, the ribs being of a vertical dimension at least equal to that of said bearing members and constituting a support for the tray, the ends of the ribs being spaced so that the handle members lie between the ends thereof when the handle members are in collapsed position.

2. A tray or the like having opposed segmental ribs on the underside of the bottom thereof the ends of the ribs being spaced, a pair of springable U-shaped handle members the arms of which terminate in inturned pintles, and combined hinge and keeper members on the underside of the tray with which said pintles are engaged, said combined hinge and keeper members having keepers on their side edges with which the arms of the handle members are springably engaged when they are in their collapsed position and having other keepers with which the arms of the handle members are engaged when the handles are in erected position, the handle members when erected with their arms engaged with said other keepers being in downwardly converging mutually bracing relation to be simultaneously grasped with one hand, the ribs being of a height at least equal to that of said combined hinge and keeper members and constituting a support for the tray, the ends of the ribs being spaced so that the handle members lie between the ends thereof when the handle members are in collapsed position.

3. In a tray or the like a pair of springable U-shaped handle members having pintles on the inner ends of their arms and combined hinge and keeper members secured to the underside of the tray in radial alignment, and having keepers on their side edges with which the handle members are engageable when collapsed against the underside of the tray and having other keepers with which the handle members are springably engageable when they are in their erected position with their lower ends in mutually supporting relation to be simultaneously grasped in one hand, and supports on the bottom of the tray of a height at least equal to the height of the combined hinge and keeper members and the thickness of the handle members positioned to constitute supports in the tray when the handle members are collapsed and the tray positioned on a flat surface.

4. In a tray or the like a pair of handle members pivotally mounted on the underside of the tray in spaced relation to be collapsed oppositely extending directions on the bottom of the tray, and keepers on the underside of the tray with which the handles are releasably engageable when collapsed, the handle members when in erected position being in downwardly converging mutually bracing relation to be simultaneously grasped with one hand, and tray supports fixed to the underside of the tray and of a height at least equal to that of the keepers and of the handle members when collapsed to constitute a support for the tray when the handles are in collapsed position.

5. In a tray or the like a pair of handle members pivotally mounted on the underside of the tray in spaced relation and being collapsible in oppositely extending directions beneath and approximately parallel to the underside of the tray, and keepers on the underside of the tray with which the handles are releasably engageable when collapsed, the handle members being mounted in side by side relation for simultaneous grasping with one hand when in erected position, and tray supports fixed to the underside of the tray of a height at least equal to that of the keepers and of the handle members when collapsed to constitute a support for the tray when the handles are in collapsed position.

References Cited in the file of this patent

UNITED STATES PATENTS

| | | |
|---|---|---|
| 724,492 | Palmer | Apr. 7, 1903 |
| 980,193 | Brenia | Jan. 3, 1911 |
| 999,315 | Kimberley | Aug. 1, 1911 |
| 1,698,489 | Bickford | Jan. 8, 1929 |
| 2,001,438 | Stuck | May 14, 1935 |
| 2,240,020 | Raiser | Apr. 29, 1941 |
| 2,513,762 | Tyson, Jr. | July 4, 1950 |